Dec. 9, 1952   R. J. IMBERT   2,620,623
FLUID DIRECTING DEVICE FOR REACTION JET NOZZLE
Filed Jan. 21, 1947

INVENTOR
R. J. Imbert
By Watson, Cole, Grindle & Watson

Patented Dec. 9, 1952

2,620,623

UNITED STATES PATENT OFFICE 2,620,623

FLUID DIRECTING DEVICE FOR REACTION JET NOZZLE

Roger Jean Imbert, Paris, France, assignor to Societe Rateau (Societe Anonyme), Paris, France, a company of France, and Rene Anxionnaz, Paris, France, jointly Application January 21, 1947, Serial No. 723,258
In France February 7, 1946

5 Claims. (Cl. 60—35.55)

It is a known fact that aircraft provided with reaction jet turbines flying at high speed have their wings loaded to a considerable extent and consequently their landing speeds are very high.

Such aircraft are provided it is true with brakes on their wheels but this manner of braking is far from being energetic enough for being satisfactory with such landing speeds.

It is therefore of particular interest to provide such aircraft with an aerodynamic braking system in order to allow them to stop after a travel as short as possible after they have come into contact with the ground whereby the braking on the landing gear wheels becomes useless and it becomes possible to provide the aircraft with shoes for the landing in lieu of wheels.

The present invention has for its object braking means operating with the gases removed from their normal path towards the nozzle and directed through suitable pipes into a direction opposing progress.

Figure 1:
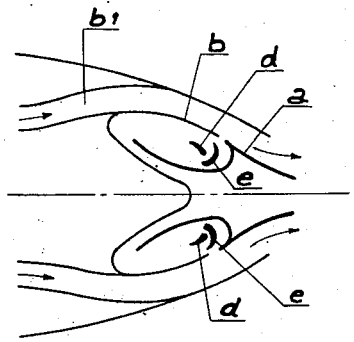
Fig. 1 is a diagrammatic sectional view of the braking system when inoperative i. e. during flight.

In Fig. 1, the fluid exhaust pipe providing for the reaction jet in an engine or turbine and forming one or more currents or flows opens to the rear of the apparatus; this fluid is exhausted in a direction opposite to progress; this is the normal arrangement during flight of any reaction jet aircraft.

The inner part $a$ of the reaction jet nozzle which in the example illustrated assumes an annular shape is independent of the fairing and is in one with the braking system which latter in the position of Fig. 1 is concealed by the inner partition $b$ defining the annular channel $b1$ through which the gases are led to the nozzle.

The member $a$ comprises, as shown, a fore annular wall element having a curved concave surface and an aft annular wall element having a frusto-conical surface. In the position of Fig. 1, the fore element is in retracted position inside the inner wall $b$ and the surface of the aft element substantially blends with the surface of the inner wall $b$.

Figure 2:
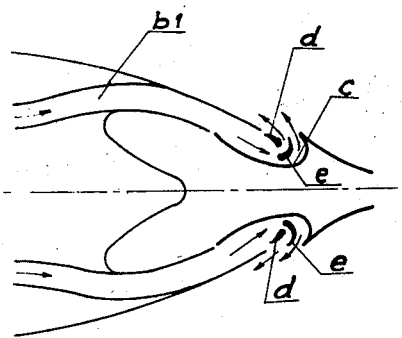
Fig. 2 shows said system as used for maximum braking for instance at the moment of landing.

In Fig. 2, the braking arrangement is shown as operative. The direction of flow of the fluid arriving through the pipe $b1$ is reversed through the bent portion $c$ and the fluid is exhausted in the direction of progress of the aircraft as illustrated by the arrows. Thus, in this case, not only does the propelling reaction exist no more, but the reverse reaction produced by the ejection of the fluid in the direction of progress is added to the resistance afforded to said progress whereby an extremely efficient braking is obtained.

It is to be noted that, in this position, the surface of the fore element substantially blends with that of the inner wall.

In the form of execution illustrated in the drawing, the braking arrangement includes a stream-lined partition $d$ which when the arrangement is operated separates the two portions of the bent duct through which the fluid is exhausted and also a deflecting member $e$ also stream-lined and adapted to prevent any eddies from appearing through a too sudden deflection of the gaseous stream. The members $d$ and $e$ are secured to the wall elements $a$ by means of rods $z$ (see Fig. 5). However, the present invention has for its object as well a bend without such extra members.

Figure 3:
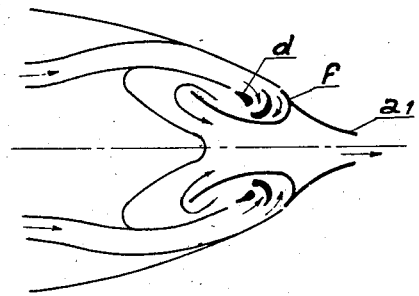
Fig. 3 illustrates an intermediary position.

During its translational movement, the braking system ensures at a given moment the intermediary position of Fig. 3. The direct exhaust of the reaction jet flow is no longer possible and said flow is constrained to pass along the path given by the arrows and is exhausted through the nozzle $a1$.

It should be noticed that the arrangement described produces no jerk as its actuation is compulsorily a gradual one. If the translation from the position of Fig. 3, to that of Fig. 2 is considered, it is apparent that a small part of the fluid is first prevented from feeding the propulsion reaction, and is rejected into the direction of progress of the aircraft, and gradually this portion of fluid increases until the entire flow of fluid is used for the braking while simultaneously the output of reaction fluid is reduced down to zero.

This braking action may be accelerated or decelerated according to landing requirements.

Figure 4:
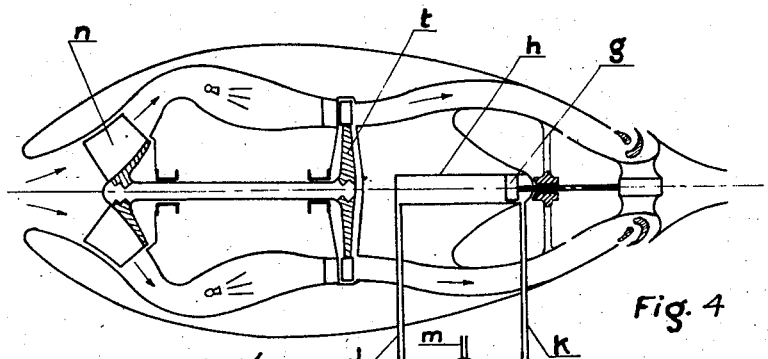
Fig. 4 shows a reaction jet turbine considered as a whole and equipped with the above arrangement together with the control means for the latter.

Fig. 4 shows diagrammatically and by way of example a complete reaction jet turbine with its compressor $n$ and its turbine $t$ equipped with the above braking system together with control means for the latter.

These control means are pneumatic and include a piston $g$ rigidly connected with the braking system. The cylinder $h$ in which the piston $g$ reciprocates, is connected with a source of compressed fluid $i$ which may feed either surface of the piston through the pipes $j$ and $k$ and through the agency of a four-way cock $l$. When one of the surfaces of the piston is submitted to the pressure of the compressed fluid, the other surface communicates with the outer atmosphere through said four-way cock and the piping $m$; the control of the cock $l$ is located within reach of the pilot.

Figure 5:
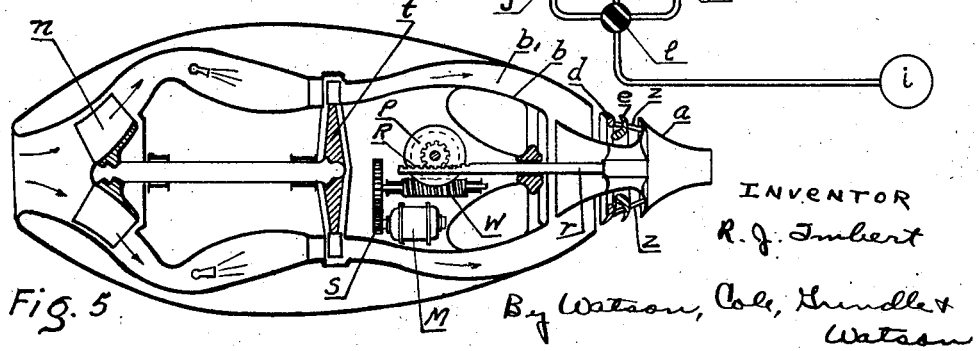
Fig. 5 is a view similar to that of Fig. 4, showing another form of control means for the braking system.

The embodiment of Fig. 5 is similar to the former one, but the control means of the braking system is different. The latter is controlled from an electric motor M acting through the agency of spur gears S driving a worm W which meshes with a pinion P. This pinion actuates a rack R integral with an axially movable rod $r$ fast with the movable braking system.

The position shown in Fig. 5 corresponds to braking (as in Fig. 2). Retraction of the braking device to normal flight position (Fig. 1) is effected by rotating the motor M in the direction corresponding to leftward motion of the rod $r$.

What I claim is:

1. In a reaction jet nozzle for aircraft and like vehicles, a stationary outer wall and a stationary inner wall providing between them an annular fluid passage, jet direction control means cooperating with the ends of said walls, axially movable with respect to said stationary walls to a propelling position and a braking position, and comprising a fore and an aft annular wall element next to one another, the aft element substantially abuts and serves in effect to prolong the said inner wall when said movable means are in the propelling position, while the fore element substantially blends with the said inner wall when said movable means are in the braking position and has a curved surface which deflects the fluid from said inner wall over the end of said outer wall and into the direction of progress of the vehicle, and means for axially moving said wall elements to and between said positions.

2. In a reaction jet nozzle for aircraft and like vehicles, a stationary outer wall and a stationary inner wall providing between them an annular fluid passage, jet direction control means cooperating with the ends of said walls, axially movable with respect to said stationary walls to a propelling position and a braking position, and comprising a fore and an aft annular wall element next to one another, said fore element having a curved concave surface and said aft element having a generally frusto-conical shape, the foremost cross-section of each of said wall elements having substantially the same size as the end section of said inner wall, the foremost portion of each of said wall elements being substantially parallel to the end portion of said inner wall, and means for axially moving said wall elements to and between said positions, whereby the aft element substantially abuts and serves in effect to prolong the said inner wall when said movable means are in the propelling position, while the fore element substantially blends with the said inner wall when said movable means are in the braking position and has a curved surface which deflects the fluid from said inner wall over the end of said outer wall and into the direction of progress of the vehicle.

3. The combination as claimed in claim 1, including a curved auxiliary member having an aerodynamic shape and secured in spaced relationship to said curved wall element to provide curved fluid passages between said auxiliary member and said curved wall element, in one part, and between said auxiliary member and the outer stationary wall, in the other part, when said movable means are in the braking position.

4. The combination as claimed in claim 2, wherein the size of the end section of the outer wall is substantially the same as that of the foremost cross-section of the aft wall element, and the end portion of the outer wall is substantially parallel to the foremost portion of said aft element.

5. The combination as claimed in claim 2, wherein a central recess is provided axially of the stationary inner wall to house the fore element when the movable means are in the propelling position, said movable means including an axial passage therethrough, the bottom of said recess being in the form of a deflecting surface adapted to deflect any fluid striking it into said axial passage.

ROGER JEAN IMBERT.

REFERENCES CITED

The following references are of record in the file of this patent:

UNITED STATES PATENTS

| Number | Name | Date |
|---|---|---|
| 1,572,812 | Rees | Feb. 9, 1926 |
| 2,243,800 | Goodyear | May 27, 1941 |
| 2,418,488 | Thompson | Apr. 8, 1947 |

FOREIGN PATENTS

| Number | Country | Date |
|---|---|---|
| 14,631 | Great Britain | Sept. 14, 1905 |
| 171,600 | Great Britain | Nov. 24, 1921 |
| 86,208 | Sweden | Apr. 28, 1946 |